United States Patent [19]

Crass et al.

[11] Patent Number: 4,502,263

[45] Date of Patent: Mar. 5, 1985

[54] SEALABLE POLYOLEFINIC MULTILAYER FILM

[75] Inventors: Günther Crass, Taunusstein; Siegfried Janocha, Wiesbaden; Wolfgang Dietz, Wiesbaden; Lothar Bothe, Mainz-Gonsenheim, all of Fed. Rep. of Germany

[73] Assignee: Hoechst Aktiengesellschaft, Frankfurt am Main, Fed. Rep. of Germany

[21] Appl. No.: 562,014

[22] Filed: Dec. 16, 1983

[30] Foreign Application Priority Data

Dec. 24, 1982 [DE] Fed. Rep. of Germany ....... 3247998

[51] Int. Cl.³ .................. B32B 27/32; B32B 31/16; B65B 11/06
[52] U.S. Cl. .................... 53/396; 428/347; 428/349; 428/354; 428/411.1; 428/447; 428/451; 428/516; 428/525; 428/523; 428/475.8; 428/336; 428/337; 428/524; 428/501; 428/497; 428/476.1
[58] Field of Search ............... 428/451, 347, 516, 411, 428/349, 447, 475.8, 520, 354, 523, 336, 337, 524, 501, 497, 476.1; 53/396

[56] References Cited

U.S. PATENT DOCUMENTS

| | | | |
|---|---|---|---|
| 3,746,953 | 7/1973 | Lapp et al. | 317/259 |
| 4,185,148 | 1/1980 | Sato et al. | 526/348.1 |
| 4,293,608 | 10/1981 | Isaka et al. | 428/220 |
| 4,303,708 | 12/1981 | Gebhardt et al. | 428/35 |
| 4,343,582 | 8/1982 | Isaka | 428/447 |
| 4,348,457 | 9/1982 | Rosenthal et al. | 428/349 |
| 4,460,631 | 7/1984 | Stegmeier | 428/349 |

FOREIGN PATENT DOCUMENTS

| | | |
|---|---|---|
| 0008623 | 3/1980 | European Pat. Off. . |
| 1145199 | 3/1969 | United Kingdom . |
| 1345748 | 2/1974 | United Kingdom . |
| 1586205 | 3/1981 | United Kingdom . |

OTHER PUBLICATIONS

*Ullmanns Encyklopaedie der technischen Chemie*, 4, neubearbeitete und erweiterte Auflage, Band 12, pp. 525-555.
"TAFMER XR" brochure, Mitsui Petrochemical Industries, Ltd.
European Search Report.

*Primary Examiner*—Ellis P. Robinson
*Attorney, Agent, or Firm*—Schwartz, Jeffery, Schwaab, Mack, Blumenthal & Koch

[57] ABSTRACT

A sealable, transparent, polyolefinic multilayer film comprises a base layer formed of a polypropylene polymer and at least one sealable layer, which contains a propylene copolymer, a low-molecular weight resin, a polypropylene homopolymer and a polydiorganosiloxane. The sealing layer is comprised of a combination of (a) from about 68.5 to 89.7% by weight, based on the weight of the sealable layer, of an olefin resin composition, comprising an ethylene-propylene-butylene terpolymer and a propylene-butylene copolymer, corresponding to a content of from about 0.1 to 7% by weight of ethylene, 53 to 89.9% by weight of propylene and 10 to 40% by weight of butylene, based on the weight of the olefin resin composition, (b) from about 5 to 15% by weight, based on the weight of the sealable layer, of a low-molecular weight resin, which compatible with the olefin resin composition, (c) from about 5 to 15% by weight, based on the weight of the sealable layer, of a propylene homopolymer, and (d) from about 0.3 to 1.5% by weight, based on the weight of the sealable layer, of a polydiorganosiloxane.

8 Claims, No Drawings

SEALABLE POLYOLEFINIC MULTILAYER FILM

BACKGROUND OF THE INVENTION

The present invention relates to a sealable polyolefinic multilayer film, comprising a base layer formed of a propylene polymer and at least one sealable layer which comprises at least one propylene copolymer, at least one low-molecular weight resin and at least one polydiorganosiloxane.

British Pat. No. 1,145,199 discloses heat-sealable laminates which comprise an oriented polypropylene film having at least one heat-sealable layer formed of an ethylene-propylene copolymer comprising from 2 to 6% by weight of ethylene and from 98 to 94% by weight of propylene. These films exhibit good heat-sealibility; however, the films are not scratch-resistant or of the desired degree of clarity, and, in addition, their processing characteristics in high-speed packaging machines are insufficient.

U.S. Pat. No. 4,348,457 describes sealable polypropylene films, which possess a sealing layer comprising an ethylene homo- or copolymer and containing a long-chain aliphatic amine, an incompatible thermoplastic component and a polydialkyl siloxane. Although these films are improved over those of British Pat. No. 1,145,199, their reliability of running in horizontal forming, filling and sealing machines is still insufficient.

U.S. Pat. No. 4,293,608 discloses a packaging material which comprises a base layer of a polypropylene polymer and a surface layer formed of a blend of a propylene-ethylene copolymer and a $C_4$ to $C_{10}$ alpha-olefin-propylene copolymer. This surface layer may also contain a low-molecular weight thermoplastic resin and silicone oils. Packaging materials of this kind have the disadvantage that they are sensitive to scratching and still have insufficient optical properties.

In their brochure "TAFMER XR, Japan 82.03.1000.Cl", Mitsui Petrochemical Industries, Ltd. describe an alpha-olefin copolymer which is suitable for use as a sealing layer for polypropylene films. As shown by Comparative Example 3, polypropylene films provided with sealing layers are, however, still unsatisfactory in many respects.

None of the prior art multilayer films combines all of the characteristics which are important in a packaging film, namely: wide sealing range, low sealing temperature, high gloss, low sensitivity to scratching and good reliability of running in high-speed packaging machines of various types.

SUMMARY OF THE INVENTION

It is an object of the present invention, therefore, to provide an improved heat-sealable polyolefin film.

It is a particular object of the invention to provide a heat-sealable transparent multilayer polyolefinic film which possesses a wide sealing range, low minimum sealing temperature, low sensitivity to scratching, high gloss, slight haze and low friction.

It is also an object of the invention to provide such a film which can be produced by means of conventional biaxial stretching equipment using roll stretching in the longitudinal direction.

Another object of the invention resides in providing a heat-sealable film which is capable of being readily processed in high-speed packaging machines of various types.

In accomplishing the foregoing objects, there has been provided in accordance with the present invention a sealable polyolefinic multilayer film, comprising a base layer comprised of a propylene polymer and at least one sealable layer containing at least one propylene copolymer, at least one low-molecular weight resin and at least one polydiorganosiloxane, wherein the sealing layer comprises a combination of (a) from about 68.5 to 89.7% by weight, based on the weight of the sealable layer, of an olefin resin composition, comprising an ethylene-propylene-butylene terpolymer and a propylene-butylene copolymer, corresponding to a content of from about 0.1 to 7% by weight of ethylene, 53 to 89.9% by weight of propylene and 10 to 40% by weight of butylene, based on the weight of the olefin resin composition, (b) from about 5 to 15% by weight, based on the weight of the sealable layer, of a low-molecular weight resin, which is compatible with the olefin resin composition, (c) from about 5 to 15% by weight, based on the weight of the sealable layer, of a propylene homopolymer, and (d) from about 0.3 to 1.5% by weight, based on the weight of the sealable layer, of a polydiorganosiloxane.

The low-molecular weight resin contained in the sealable layer is advantageously selected from the group consisting of hydrocarbon resins, ketone resins, polyamide resins, colophonium resins, dammar resins and chlorinated aliphatic and aromatic resins. Component (d) of the sealable layer preferably comprises a polydiorganosiloxane which has a kinematic viscosity of at least about 100 $mm^2/s$ at 25° C. The biaxially stretched multilayer film preferably has a thickness of from about 10 to 50 microns, in particular of from about 15 to 35 microns.

The multilayer film of the present invention is used especially as a packaging film in high-speed wrapping machines.

Further objects, features and advantages of the present invention will become apparent from the detailed description of preferred embodiments which follows.

DETAILED DESCRIPTION OF PREFERRED EMBODIMENTS

The base layer of the sealable polyolefinic multilayer film is formed of a propylene polymer which is, for the major part, comprised of propylene and has a melting point of 140° C. or higher, preferably of 150° C. or higher.

Specific examples of the polypropylene polymer forming the base layer include isotactic polypropylene, having an n-heptane-soluble constituent of 15% by weight and less, copolymers of ethylene and propylene, having an ethylene content of 10% by weight or less, copolymers of polypropylene with $C_4$ to $C_8$ alpha-olefins, having a content of $C_4$ to $C_8$ alpha-olefins of 10% by weight or less.

The propylene polymer of the base layer appropriately has a melt flow index of from about 0.5 g/10 min to 8 g/10 min, in particular of from about 1.5 g/10 min to 4 g/10 min, at 230° C. and under a load of 2.16 kg (DIN No. 53,735).

The base layer comprising the propylene polymer may further contain conventional additives, for example, antistatic agents, lubricants and stabilizers.

The multilayer film of the present invention is transparent, i.e., neither its polypropylene base layer nor its sealing layer(s) contain any hazing constituents.

The olefin resin composition of the sealable layer, which is used in the multilayer films of the present invention contains from about 25 to 70% by weight, preferably from about 40 to 60% by weight, of a constituent which is soluble in p-xylene at 20° C. The melting point of the olefin resin composition is about 130° C. or higher. The olefin resin composition has a melt flow index of from about 0.1 to 16 g/10 min at 230° C. and under a load of 2.16 kg (DIN No. 53,735), in particular of from about 4 to 10 g/10 min at 230° C. and under a load of 2.16 kg.

The copolymer of alpha-olefins which is marketed by Mitsui Petrochemical Industries, Ltd. under the tradename of TAFMER XR-106L has proved to be particularly suitable.

The low-molecular weight resin used in the present invention, which is compatible with the olefin resin composition, comprises a natural or synthetic resin which has a softening point in the range from about 60° to 180° C. (determined according to DIN No. 1995-U4), preferably in the range from about 80° to 130° C.

Compatible resins are to be understood as including resins of a type which, when added to the olefin resin composition of the sealing layer in a concentration of up to about 15% by weight, do not cause any deterioration of the haze of the sealing layer.

Examples of suitable low-molecular weight thermoplastic resins which are compatible with the olefin resin composition include hydrocarbon resins, ketone resins, polyamide resins, colophonium, dammar resins, chlorinated aliphatic and aromatic hydrocarbon resins. These resins are described in "Ullmann, Encyklopaedie der technischen Chemie" (Ullmann's Encyclopedia of Industrial Chemistry), Volume 12, 1976, pages 525 to 555.

By "hydrocarbon resins" there are to be understood polymers which are substantially comprised of carbon and hydrogen and the constituents of which can be recovered, for example, from coke oven gas, from coal tar distillates, in cracking processes of naphtha and gas-oil and from turpentine oil. Important representatives of hydrocarbon resins which may be mentioned are the petroleum resins, the resins from coal tar and the turpentine resins. Typical examples of hydrocarbon resins are coumarone resins, mineral oil resins, and terpene resins. These resins are described at pages 539 to 546 of the above-mentioned volume of Ullmann.

Coumarone resins are usually obtained by polymerization of fractions of coal tar light oil, which have been freed from phenols and bases and which contain, for example, indene, sytrene, dicyclopentadiene, coumarone and the homologs thereof as unsaturated components. By copolymerization with phenol and combination with other synthetic resins, coumarone resins can be modified in many ways. These resins are described at pages 545 to 546 of the above-mentioned volume of Ullmann.

The basic materials of mineral oil resins are obtained in the cracking of naphtha or gas-oil into raw materials for the chemical industry, for example, ethylene and propylene. Such basic materials are, for example, resin-forming compounds, such as butene, butadiene, pentene, piperylene, isoprene, cyclopentadiene, dicyclopentadiene, alkylbenzenes, methyl dicyclopentadiene, methyl indene, naphthalene, styrene, indene, vinyl toluene, methyl styrene. These resins are described at pages 541 to 542 of the above-mentioned volume of Ullmann.

Terpene resins are polymers of terpenes. Suitable terpenes are, for example, beta-pinene, dipentene, limonene, myrcene, bornylene, camphene, and similar terpenes. These resins are described at pages 542 to 543 of the above-mentioned volume of Ullmann.

It is to be pointed out that the hydrocarbons are capable of being modified by reacting the raw materials prior to carrying out polymerization, by introducing special monomers, or by reacting the polymerized product. In this connection, special mention is made of hydrogenation or partial hydrogenation of unsaturated constituents of the resins. Possibilities of modifying hydrocarbon resins are described in Ullmann's Encyclopedia, Volume 12, 1976, pages 543 to 544.

The term "colophonium" covers natural resins which are obtained by distilling turpentine oil from a turpentine balsam recovered by tapping various species of pine (balsamic resins), by solvent extraction of old root stalks (wood resins) and by fractional distillation of talloil (tall resins). Colophonium is also meant to include colophonium esters, as well as modified colophonium (e.g., hydrogenated, dehydrogenated, fractionated, isomerized and disproportionated colophonium) and similar substances. Colophonium is described in Ullmann's Encyclopedia, Volume 12, 1976, pages 529 to 536.

Condensation resins result from an acid-catalyzed condensation of mineral oil fractions with aldehydes. Typical representatives of such resins are xylene-formaldehyde resins and naphthalene-formaldehyde resins. Condensation resins are described at page 542, Volume 12, of Ullmann's Encyclopedia.

Dammar resins are obtained by tapping trees of the dipterocarpaicae family. These resins are described at page 527 of Ullmann's Encyclopedia, Volume 12, 1976.

The amount of the low-molecular weight resin which is compatible with the olefin resin composition should not fall below a lower limit of about 5% by weight, based on the weight of the sealable layer, since an effect of the resin addition on the optical properties and the sensitivity to scratching will only appear at higher resin proportions. Additions in excess of about 15% by weight, based on the weight of the sealable layer, of low-molecular weight resin which is compatible with the olefin resin composition, have proved inappropriate for reasons of process engineering.

The polypropylene homopolymer which is used as component (c) of the sealing layer should have a melting temperature which is higher than the melting temperature of component (a). If less than about 5% by weight of the polypropylene homopolymer is added, there will only be slight improvements in optical properties and scratch resistance, and the runability in high-speed packaging machines will not be sufficiently improved. Additions in excess of about 15% by weight would further improve optical properties, scratch resistance and runability; however, in that instance, a marked deterioration of sealing characteristics would result.

According to the invention, it is possible to use polydiorganosiloxanes or mixtures thereof, which have a viscosity of at least about 100 mm$^2$/s at 25° C. Examples of suitable polydiorganosiloxanes are polydialkyl siloxanes, polyalkylphenyl siloxanes, olefin-modified siloxane oils, polyether-modified silicone oils, olefin/polyether-modified silicone oils, epoxy-modified silicone oils and alcohol-modified silicone oils, polydialkyl siloxanes which preferably have from 1 to 4 carbon atoms in the alkyl group, in particular polydimethyl siloxanes.

Component (d) of the sealable layer should comprise at least about 0.3% by weight, based on the weight of the sealable layer, of polydiorganosiloxane, since in the combination of raw materials described, a lower proportion would lead to an increasing number of rejections in high-speed packaging machines. On the other hand, amounts of polydiorganosiloxane exceeding about 1.5% by weight, based on the weight of the sealable layer, would lead to technical difficulties in film production and also to defective wrappings obtained in packaging machines, as a result of insufficient friction.

It is possible to add conventional additives, for example, lubricants, antistatic agents and stabilizers to the sealable layer.

The thickness of the sealing layer(s) should be below about 3 microns, particularly below about 1 micron, since the processing behavior in high-speed packaging machines would again deteriorate at greater layer thickness.

The object of the invention is achieved by using the sealing layer of the present invention which comprises a combination of four components as specified in subparagraph A above.

The wide sealing range and the low minimum sealing temperature are obtained by the olefin resin composition. The low sensitivity to scratching and the good optical properties (gloss haze) result from the synergistically acting combination of propylene homopolymer and low-molecular weight resin, which, surprisingly, does not impair the sealing characteristics, although the pure propylene homopolymer is not sealable. The good processibility can be ascribed to the added polydiorganosiloxane in connection with the propylene homopolymer which is harder than the olefin resin composition. Moreover, sticking to the rolls in the longitudinal stretching zone is prevented by the combination of the four components according to subparagraph A.

The limits specified for the amounts of olefin resin composition (a), i.e., from about 68.5 to 89.7% by weight, based on the weight of the sealable layer, result from the fact that lower amounts of olefin resin composition lead to a rise in the minimum sealing temperature and a drop in sealing strength, whereas higher amounts of olefin resin composition lead to a reduction of the positive effects of the additions according to the invention.

Unless specifically mentioned, the individual data were determined according to the following methods:

| Melt flow index | DIN 53,735, at 230° C. and under a load of 2.16 kp, |
| --- | --- |
| Softening point | DIN 1995 - U4, |
| Melting point | DCS measurement, peak of melting curve, rate of heating 20° C./min. |

Haze:

Haze of the film is measured according to ASTM-D 1003-52; however, using a 1° slit diaphragm instead of a 4° aperture plate, and haze is indicated in percent for four superposed film layers. Four layers were chosen since, in this way, the optimum measurement range is obtained.

Gloss:

Gloss is measured by means of a type RGN 10.01.02 reflectometer, according to Dr. Schwarzau, Berlin, using a planar, polished black glass plate as the standard.

Scratch Resistance or Sensitivity to Scratching:

Scratch resistance is determined according to DIN No. 53,754.

For determining the scratch resistance, an abrasion meter Taber Model 503 Abraser, manufacturer Teledyne Taber, is employed, using CALIBRADE H18 friction discs loaded with 250 g. Scratch resistance or sensitivity to scratching is to be understood as meaning the increase in haze of the scratched film as compared with the original film, after 50 revolutions of the turntable.

EXAMPLES

With the aid of the coextrusion process, multilayer films which had, in sum, a thickness of 1 mm, in each case, were extruded through a slot die having a width of 280 mm and a height of gap of 1.8 mm, at an extrusion temperature of 260° C. and a throughput of 70 kg/h. The film had a base layer formed of polypropylene having a melt flow index of 2 g/10 min and two outer layers of various compositions.

After passing through a 20 mm long air gap, these films were chilled on a chill roll at 30° C., which had a diameter of 600 mm and rotated at a circumferential speed of 4.5 m/min. From the chill roll, the films were then passed on to a tension isolation device consisting of three rolls, which also had a temperature of 30° C. and rotated at a circumferential speed of 4.5 m/min. The films were then heated to a temperature of 130° C. and longitudinally stretched by a factor of 5 by a further arrangement of three rolls. After stretching in the longitudinal direction, they were stretched 10-fold in the transverse direction, at an ambient temperature of 175° C. The multilayer films thus formed had a base layer of polypropylene having a thickness of about 19 microns and, on either side thereof, a sealing layer having a thickness of from about 0.5 to 0.8 micron.

In the table which follows, the characteristics of the different multilayer films produced are compiled.

EXAMPLE 1

The sealing layers were composed of:
(a) 79% by weight, based on the weight of the sealing layer, of an olefin resin composition (TAFMER XR-106L), composed of
 ($a_1$) 50% by weight of an ethylene-propylene-butylene terpolymer, comprising 1.4% by weight of ethylene, 2.8% by weight of butylene and 95.8% by weight of propylene (in each case based on the weight of the terpolymer), and
 ($a_2$) 50% by weight of a propylene-butylene copolymer, comprising 66.8% by weight of propylene and 33.2% by weight of butylene (in ech case based on the weight of the copolymer),
which corresponds to a content of 0.7% by weight of ethylene, 81.3% by weight of propylene and 18% by weight of butylene, based on the weight of TAFMER XR-106L. The olefin resin composition $a_1+a_2$ had a melt flow index of 8 g/10 min and a melting point of 150° C.
(b) 10% by weight, based on the weight of the sealing layer, of ARKON P 125, which is a hydrogenated hydrocarbon resin having a softening point of 125° C.;

(c) 10% by weight, based on the weight of the sealing layer, of a propylene homopolymer having a melting point of 162° C. (HOSTALEN PPN 1060F); and (d) 1% by weight based on the weight of the sealing layer, of polydimethylsiloxane having a kinematic viscosity 30,000 mm²/s at 25° C.

Components a, b, c and d were in a homogeneously distributed state, when they were used for the production of the multilayer film.

methylsiloxane and 10% by weight of polypropylene homopolymer.

COMPARATIVE EXAMPLE 6

The sealing layer according to Comparative Example 4 was used, which additionally contained 10% by weight of a hydrogenated hydrocarbon resin (ARKON P 125), corresponding to 89% by weight of olefin resin composition, 1% by weight of polydimethylsiloxane and 10% by weight of resin.

TABLE

| Example | Gloss (%) $\frac{S1 + S2}{2}$ | Haze (%) 4 layers | SS (%) $\frac{S1 + S2}{2}$ | Miniumum Sealing Temp. (°C.) $\frac{S1 + S2}{2}$ | Runability* vFFS | hFFS | Wrapping Machine |
|---|---|---|---|---|---|---|---|
| Example 1 | 173 | 17 | 24 | 90 | ++ | ++ | ++ |
| Comparative Example 1 | 135 | 30 | 40 | 124 | ++ | — | — |
| Comparative Example 2 | 153 | 22 | 35 | 122 | ++ | ± | ++ |
| Comparative Example 3 | 166 | 23 | 46 | 90 | ± | — | — |
| Comparative Example 4 | 168 | 24 | 35 | 92 | + | + | + |
| Comparative Example 5 | 170 | 21 | 30 | 92 | ++ | ++ | ++ |
| Comparative Example 6 | 170 | 20 | 32 | 90 | + | + | ± |

SS = Sensitivity to Scratching
vFFS = vertical forming, filling and sealing machine
hFFS = horizontal forming, filling and sealing machine
* = visual evaluation
$\frac{S1 + S2}{2}$ = average of the two sides of the film
++ very good 2% of sample packages with faulty wrappings
+ good 5% of sample packages with faulty wrappings
± sufficient 10% of sample packages with faulty wrappings
− insufficient 15% of sample packages with faulty wrappings
— useless ≧ 15 % of sample packages with faulty wrappings

COMPARATIVE EXAMPLE 1

Example 1 was repeated, however, the combination of components a, b, c and d of the sealing layer was replaced by a random copolymer of ethylene and propylene, comprising 4.5% by weight of ethylene, without any further additions (comparison with British Pat. No. 1,145,199).

COMPARATIVE EXAMPLE 2

Example 1 was repeated, however, the raw material used for the sealing layers corresponded to Example 2 of U.S. Pat. No. 4,348,457.

COMPARATIVE EXAMPLE 3

Example 1 was repeated, however, with the sealing layer only comprising component (a); this mixture of a₁ plus a₂ (TAFMER XR 106L) corresponds to a content of 0.7% by weight of ethylene, 81.3% by weight of propylene and 18% by weight of butylene, based on the weight of the sealing layer.

COMPARATIVE EXAMPLE 4

The sealing layer according to Comparative Example 3 was used, which additionally contained 1% by weight, based on the weight of the sealing layer, of polydimethylsiloxane having a kinematic viscosity of 30,000 mm²/s at 25° C.

COMPARATIVE EXAMPLE 5

The sealing layer according to Comparative Example 4 was used, which additionally contained 10% by weight of a polypropylene homopolymer (HOSTALEN PPN 1060F), corresponding to 89% by weight of olefin resin composition, 1% by weight of polydi- The table clearly shows the superiority of the film according to the invention used in Example 1.

The films of Comparative Examples 1 to 6 exhibit good properties for individual features, but none of the multilayer films according to the Comparative Examples combines all requirements, i.e., wide sealing range, low minimum sealing temperature, good optical properties, low sensitivity to scratching, low friction and excellent reliability of running in high-speed packaging machines of various types (vFFS, uFFS and wrapping machines).

The sealable polyolefinic multilayer film according to the present invention, as used in Example 1, on the other hand, proves to be a film which meets all requirements.

What is claimed is:

1. Sealable polyolefinic multilayer film, comprising a base layer comprised of a propylene polymer and at least one sealable layer containing at least one propylene copolymer, at least one low-molecular weight resin and at least one polydiorganosiloxane, wherein the sealing layer comprises a combination of
    (a) from about 68.5 to 89.7% by weight, based on the weight of the sealable layer, of an olefin resin composition, comprising an ethylene-propylene-butylene terpolymer and a propylene-butylene copolymer, corresponding to a content of from about 0.1 to 7% by weight of ethylene, 53 to 89.9% by weight of propylene and 10 to 40% by weight of butylene, based on the weight of the olefin resin composition,
    (b) from about 5 to 15% by weight, based on the weight of the sealable layer, of a low-molecular weight resin, which is compatible with the olefin resin composition, (c) from about 5 to 15% by weight, based on the weight of the sealable layer, of a propylene homopolymer, and (d) from about 0.3 to 1.5% by weight, based on the weight of the sealable layer, of a polydiorganosiloxane.

2. A multilayer film as claimed in claim 1, wherein component (b) of the sealable layer comprises at least one low-molecular weight resin selected from the group consisting of hydrocarbon resins, ketone resins, polyamide resins, colophonium resins, dammar resins and chlorinated aliphatic and aromatic resins.

3. A multilayer film as claimed in claim 1, wherein component (d) of the sealable layer comprises a polydiorganosiloxane which has a kinematic viscosity of at least about 100 mm$^2$/s at 25° C.

4. A multilayer film as claimed in claim 1, wherein the multilayer film has been biaxially stretched and has a thickness from about 10 to 50 microns.

5. A multilayer film as claimed in claim 4, wherein the film has a thickness of from about 15 to 35 microns.

6. A multilayer film as claimed in claim 1, wherein the sealing layer has a thickness of less than about 3 microns.

7. A multilayer film as claimed in claim 12, wherein the sealing layer has a thickness of less than about 1 micron.

8. A process for the high-speed packaging of articles, comprising the step of running a multilayer film as claimed in claim 1 in a high-speed packaging machine and packaging an article with said film.

* * * * *